(12) United States Patent
Tanaka

(10) Patent No.: US 8,429,463 B2
(45) Date of Patent: Apr. 23, 2013

(54) LOG MANAGEMENT METHOD AND APPARATUS, INFORMATION PROCESSING APPARATUS WITH LOG MANAGEMENT APPARATUS AND STORAGE MEDIUM

(75) Inventor: Masao Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 12/566,276

(22) Filed: Sep. 24, 2009

(65) Prior Publication Data

US 2010/0083046 A1   Apr. 1, 2010

(30) Foreign Application Priority Data

Sep. 30, 2008   (JP) ................................. 2008-252006

(51) Int. Cl.
   *G06F 11/00*   (2006.01)
(52) U.S. Cl.
   USPC .................................. 714/45; 714/37; 714/57
(58) Field of Classification Search ................... 714/25, 714/37, 45, 46, 57
   See application file for complete search history.

(56) References Cited

U.S. PATENT DOCUMENTS

| | | | | |
|---|---|---|---|---|
| 5,689,416 | A * | 11/1997 | Shimizu et al. ................. | 700/80 |
| 5,819,094 | A * | 10/1998 | Sato et al. ...................... | 717/131 |
| 5,911,143 | A | 6/1999 | Deinhart et al. | |
| 6,353,902 | B1 * | 3/2002 | Kulatunge et al. ............. | 714/712 |
| 6,622,264 | B1 * | 9/2003 | Bliley et al. ..................... | 714/26 |
| 6,947,797 | B2 * | 9/2005 | Dean et al. ....................... | 700/79 |
| 7,849,363 | B2 | 12/2010 | Mochizuki et al. | |
| 2003/0037288 | A1 * | 2/2003 | Harper et al. ................... | 714/37 |
| 2005/0080806 | A1 * | 4/2005 | Doganata et al. ............. | 707/102 |
| 2006/0085689 | A1 * | 4/2006 | Bjorsne ........................... | 714/39 |
| 2006/0149808 | A1 * | 7/2006 | Weiner et al. .................. | 709/203 |
| 2008/0065928 | A1 | 3/2008 | Suzuki et al. | |
| 2008/0114874 | A1 * | 5/2008 | Meir et al. ...................... | 709/224 |
| 2008/0168308 | A1 * | 7/2008 | Eberbach et al. ............... | 714/26 |
| 2008/0183704 | A1 * | 7/2008 | Miller et al. ..................... | 707/6 |
| 2009/0003311 | A1 * | 1/2009 | Clarisse et al. ............... | 370/351 |

FOREIGN PATENT DOCUMENTS

| | | |
|---|---|---|
| JP | 08-087454 | 4/1996 |
| JP | 2001-256032 A | 9/2001 |
| JP | 2004-206166 A | 7/2004 |
| JP | 2005-141663 A | 6/2005 |
| JP | 2006-302170 A | 11/2006 |
| JP | 2008-65668 A | 3/2008 |
| JP | 2008-140248 A | 6/2008 |

OTHER PUBLICATIONS

Japanese Office Action mailed Nov. 6, 2012 for corresponding Japanese Application No. 2008-252006, with English-language Translation.

* cited by examiner

*Primary Examiner* — Joshua Lohn
(74) *Attorney, Agent, or Firm* — Fujitsu Patent Center

(57) ABSTRACT

One system monitors components constituting an information apparatus and a program in execution. The system classifies logs outputted from the information processing apparatus for each monitor target, divides the monitor targets into categories of hardware and software, refers to relationship definition information indicating the combination of monitor targets in which an operational relationship exists between monitor targets belonging to different categories and specifies a combination indicated in the relationship definition information among monitor targets whose logs are classified. The system relates logs arranged for each monitor target on the basis of the specified combination and outputs the logs on a display device.

8 Claims, 18 Drawing Sheets

| DATE | TIME | COUNTERMEASURES | TYPE | FACTOR |
|------|-------|-----------------|-------------|--------------|
| 1/12 | 00:01 | SOFTWARE SA | ABNORMALITY | FACTOR aaaa ⋯ |
| 1/12 | 00:25 | SOFTWARE SB | EVENT | FACTOR bbbb ⋯ |
| 1/12 | 00:35 | COMPONENT HA | ABNORMALITY | FACTOR cccc ⋯ |
| 1/12 | 00:36 | SOFTWARE SA | ABNORMALITY | FACTOR dddd ⋯ |
| 1/12 | 01:53 | COMPONENT HB | ABNORMALITY | FACTOR eeee ⋯ |
| 1/12 | 02:19 | SOFTWARE SC | EVENT | FACTOR ffff ⋯ |
| 1/12 | 02:21 | COMPONENT HA | FAILURE | FACTOR gggg ⋯ |
| ⋮ | ⋮ | ⋮ | ⋮ | ⋮ |
| 1/25 | 05:42 | SOFTWARE SA | ABNORMALITY | FACTOR zzzz ⋯ |

FIG. 3  PRIOR ART

| COMPONENT | MOUNTING POSITION | STATE | KEYWORD |
|---|---|---|---|
| COMPONENT HA | CPU-SLOT#0 | normal | CPU, cpu, Cpu |
| COMPONENT HB | MEM-SLOT#0 | normal | MEM, mem, Mem |
| COMPONENT HC | MEM-SLOT#1 | normal | MEM, mem, Mem |
| COMPONENT HD | MEM-SLOT#2 | normal | MEM, mem, Mem |
| COMPONENT HE | MEM-SLOT#3 | normal | MEM, mem, Mem |
| COMPONENT HF | PCI-SLOT#0 | normal | PCI, pci |
| COMPONENT HG | PCI-SLOT#1 | normal | PCI, pci |
| COMPONENT HH | PCI-SLOT#2 | normal | PCI, pci |
| : | | | |

24a

F I G. 5

| SOFTWARE NAME | CATEGORY | DETAILED INFORMATION |
|---|---|---|
| SOFTWARE SA | system | CPU patrol diagnosis |
| SOFTWARE SB | system | Memory driver |
| SOFTWARE SC | application | Web Browser |
| SOFTWARE SD | system | Core Kernel software |
| SOFTWARE SE | application | Header files |
| SOFTWARE SF | system | Drivers for the PCI bus |
| SOFTWARE SG | system | PCI Ethernet Driver |
| : | | |

F I G. 6

| COMPONENT | RELATED SOFTWARE |
|---|---|
| COMPONENT HA | SOFTWARE SA |
| COMPONENT HB | SOFTWARE SB |
| — | SOFTWARE SC |
| COMPONENT HF | SOFTWARE SF, SOFTWARE SG |
| : | |

FIG. 7

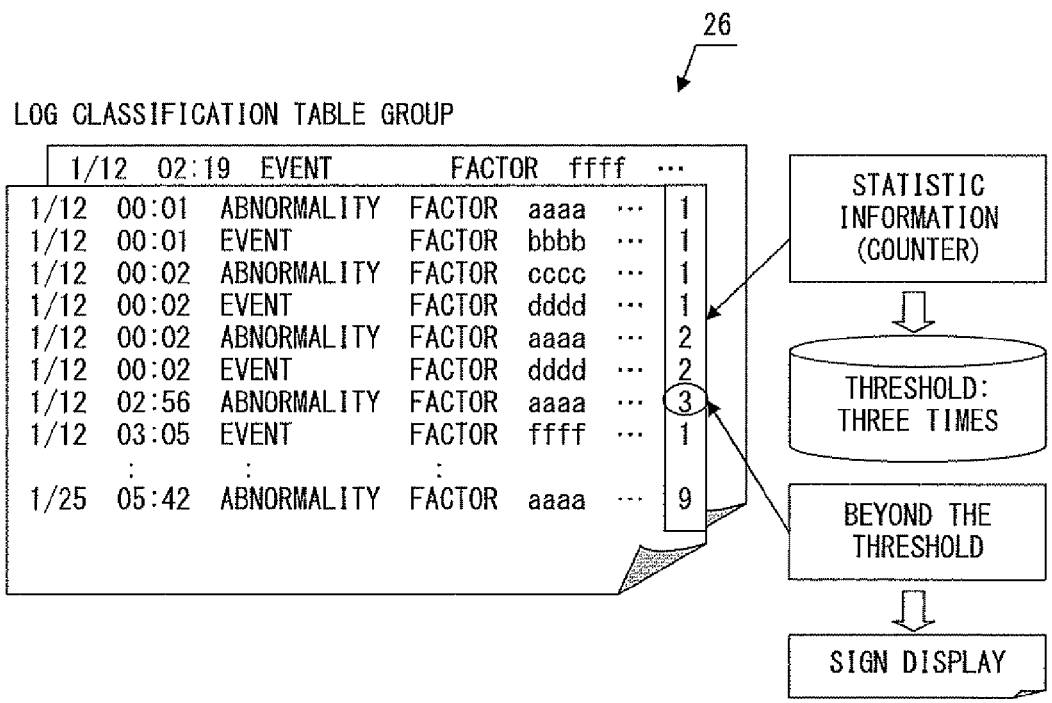
F I G. 1 2

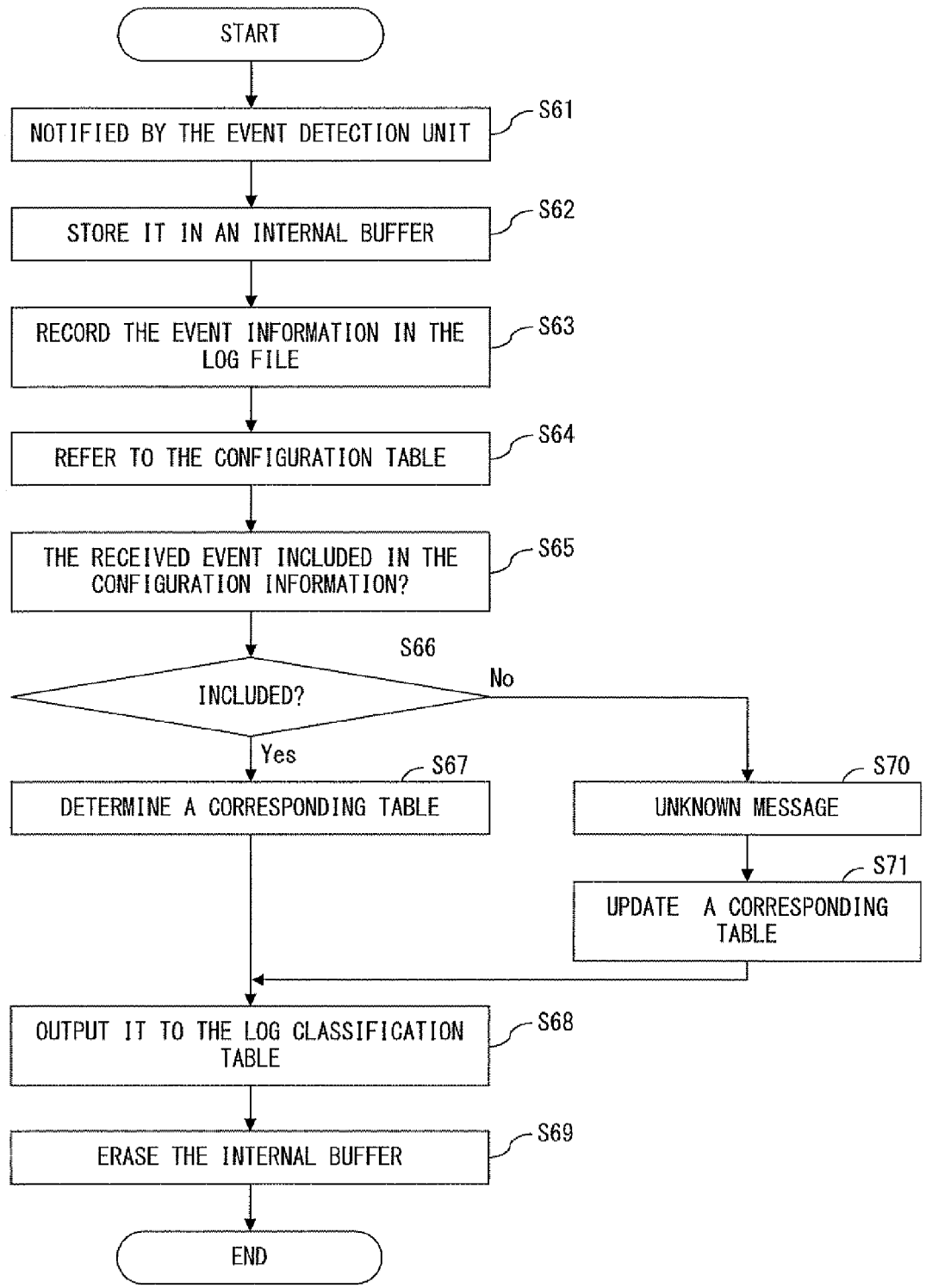
F I G. 1 6

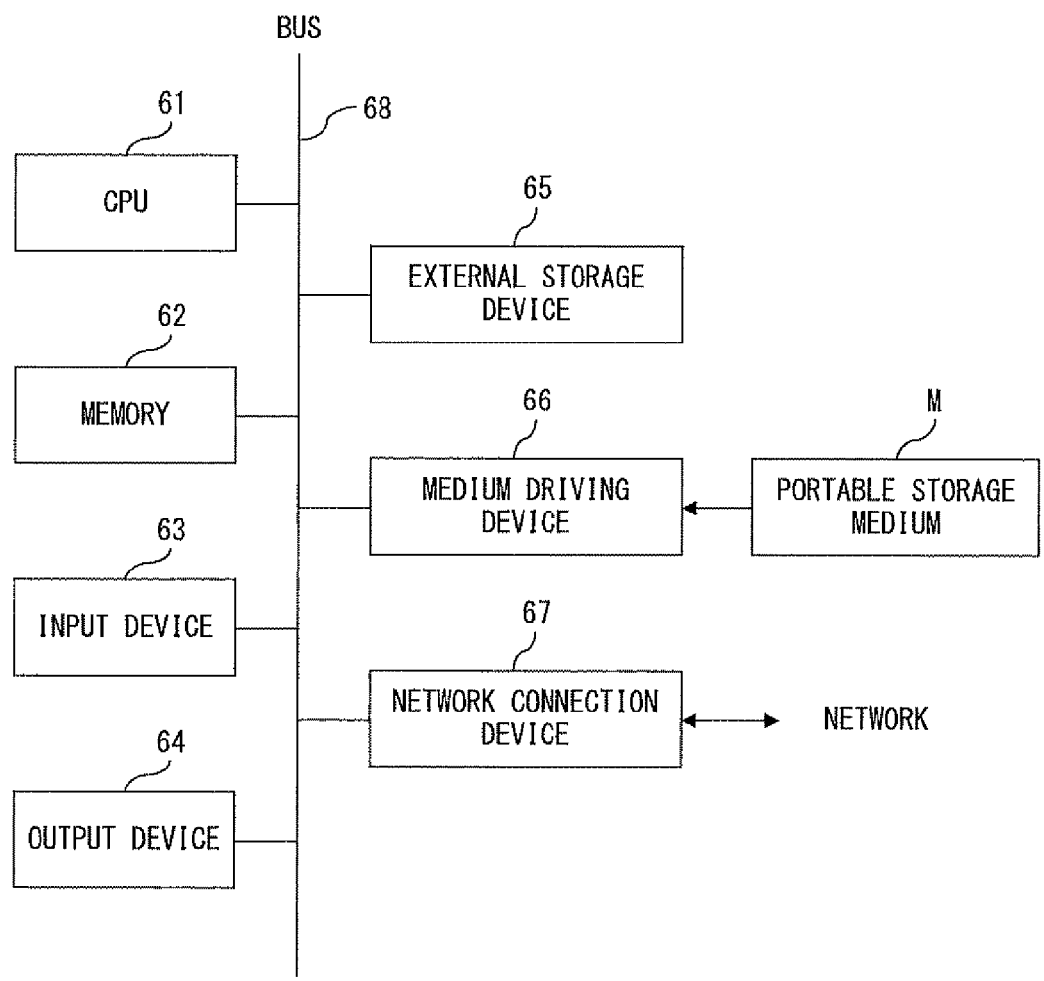
F I G. 18

LOG MANAGEMENT METHOD AND APPARATUS, INFORMATION PROCESSING APPARATUS WITH LOG MANAGEMENT APPARATUS AND STORAGE MEDIUM

CROSS-REFERENCE TO RELATED APPLICATION

This application is based upon and claims the benefit of priority of the prior Japanese Patent Application No. 2008-252006, filed on Sep. 30, 2008, the entire contents of which are incorporated herein by reference.

FIELD

The embodiments discussed herein are related to a technology for managing monitor targets existing in an information processing apparatus (computer), that is, components constituting the information processing apparatus and programs in execution and outputting log by monitoring.

BACKGROUND

Conventionally, in an information processing apparatus, such as a server and the like, a log (or log message) has been recorded with each of components, such as the hardware and software of a computer constituting the system as a target. The log becomes information indicating the time transition of an event, such as the operation, state, operational state and the like. On the server constituting a system providing services via a communication network, various events of the system, such as log-on/log-off, warning, the state of occurrence abnormality or failure and the like of a registered user are recorded. Therefore, the log is used to investigate a cause at the time of failure or detect the traces of an unlawful access, and take the operational statistics of the system and so on.

FIG. 1 explains the operation of a conventional log management apparatus. The log management apparatus 110 is mounted on a server 100 for providing services via a communication network. For example, it can be realized by software mounting a function to enable it to operate as the log management apparatus 110.

A hardware group 101, such as a CPU (central processing unit), memory, a system controller, a hard disk device (HDD), a host bus adaptor and the like, which constitute the server 100 and software (application program, etc.) operating in an operating system (OS) 102 become monitor targets whose log is kept. The OS 102 monitors the operation of each piece of software, and when some kind of events occurred or its state changed, outputs a log indicating the contents to the log management apparatus 110. The OS 102 also monitors the operation of each piece of hardware constituting the hardware group 101, and when some abnormality seems to occur or actually occurred, notifies the event detection unit 103 of it (warning or abnormality). Then, in response to the notice, the event notification unit 103 outputs the occurred abnormality and a log indicating hardware in which the abnormality has occurred to the log management apparatus 110. Thus, the log management apparatus 110 stores logs outputted from the OS 102 or the event notification unit 103 in a log file 104.

The log file is stored in, for example, a non-volatile storage medium (for example, a hard disk device) mounted on the server 100 as one of the hardware group 101 or the like. The event detection unit 103 can be realized by, for example, one piece of software mounted on the OS 102.

FIG. 2 explains a log stored in the log file 104 by the conventional log management apparatus 110.

FIG. 2 illustrates an outputted log using a case where abnormality or a failure whose log to be outputted has occurred in components HA and HB constituting the hardware group 101 and abnormality or an event whose log to be outputted has occurred in software (described as "software" in FIG. 2) SA, SB and SC operating on the OS 102 as an example. For example, a log outputted to the log management apparatus 110 by the fact that abnormality has occurred in the software SA is described as "software SA abnormality". The event detection unit 103 is not illustrated in FIG. 2 since it is assumed that it is part of the OS 102. As illustrated in FIG. 2, a log is outputted any time a monitor target enters a state where a log to be outputted. Thus, various types/monitor targets of logs are mixed in time sequence and stored in the log file 104.

FIG. 3 illustrates the contents of a log stored in the log file 104. As illustrated in FIG. 3, each log includes respective pieces of data of its outputted date, its time, its monitor target, its type and its factor. The type corresponds to a cause why a log to be outputted, more particularly, abnormality, an event, a failure or the like. The factor corresponds to a reason why it is determined that the cause being the type has occurred.

The logs are information useful for coping with the failure. However, the various types/monitor targets of logs are mixed in time sequence and stored in the log file 104. Therefore, the analysis of the log requires enormous time and labor.

Some conventional log management apparatus extracts a log meeting a retrieval condition from logs collected in a log file and outputs it (Japanese Laid-open Patent Publication No. 2005-141663).

A log management apparatus in which a retrieval condition can be set extracts a log preferable for analysis by setting an appropriate retrieval condition so that a log can be more easily analyzed. However, in this case, only a log preferable for analysis cannot always be extracted. It is common that a log unnecessary for analysis exists or a log preferable for analysis is lost. Furthermore, in order to set an appropriate retrieval condition, some degree of knowledge and experiences are preferable. Therefore, a method other than retrieval to be focused in order to assist maintenance personnel in such a way as to analyze a log more easily.

As technical reference documents, besides the above-described, there are Japanese Laid-open Patent Publication Nos. 2006-302170 and 2004-206166.

SUMMARY

One system to which the present invention is applied classifies the logs for each of the monitor targets existing in the information processing apparatus, divides the monitor targets into categories of hardware and software, refers to relationship definition information indicating a combination of monitor targets, in which it is regarded that an operational relationship exists between monitor targets belonging to different categories, specifies a combination indicated in the relationship definition information among monitor targets whose logs are classified in the classification process and relates the logs classified for each of the monitor targets in the classification process on the basis of the combination specified in the specification process and outputs the logs on a display device.

Components being hardware constituting the information processing apparatus (computer) operate under the control of a program (software) executed in the information processing apparatus. Therefore, an operational relationship (dependence relationship) in log output in which when a component operated by a program does not normally operate or an inconvenience exists in a program for operating a component, by the output of the log of a monitor target belonging to one category, the log of another monitor target related to the monitor target is outputted, if monitor targets are classified into categories of software and hardware, is established.

Focusing on this relationship (dependence relationship), logs are classified for each monitor target and outputted (displayed). In a monitor target which is the cause of a failure and in which a dependence relationship with the monitor target exists, a log is outputted in fairly high frequency.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 illustrates the contents of a log stored in the log file;

FIG. 5 is a data structure of a hardware configuration table;

FIG. 6 is a data structure of a software configuration table;

FIG. 7 is a data structure of relationship definition information;

FIG. 12 explains how to determine an error sign;

FIG. 16 is a flowchart of a log classification process;

FIG. 18 is one example of the preferred embodiment of the hardware composition.

DESCRIPTION OF EMBODIMENTS

Preferred embodiments of the present invention will be explained in detail with reference to accompanying drawings.

Figure 1:
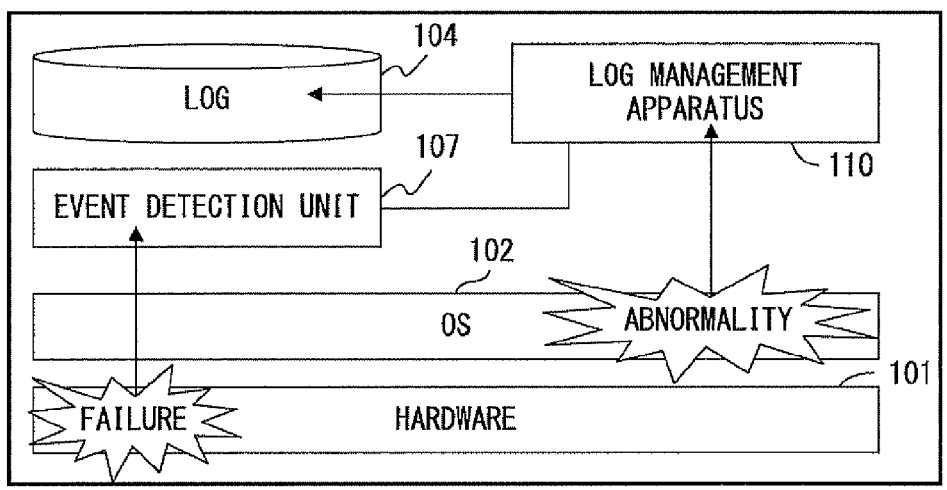
FIG. 1 explains the operation of a conventional log management apparatus.
Figure 2:
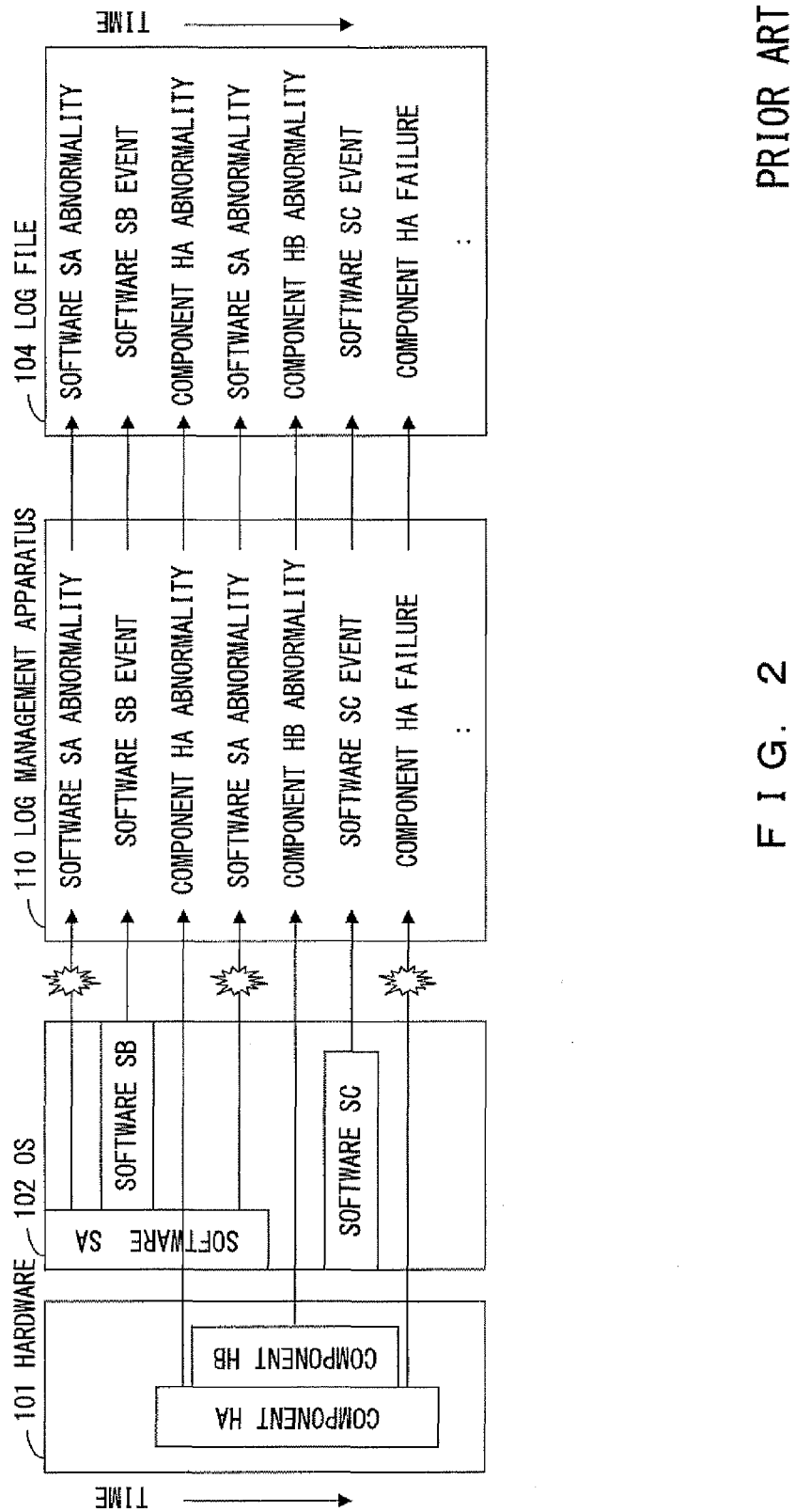
FIG. 2 explains a log stored in a log file by the conventional log management apparatus.
Figure 4:
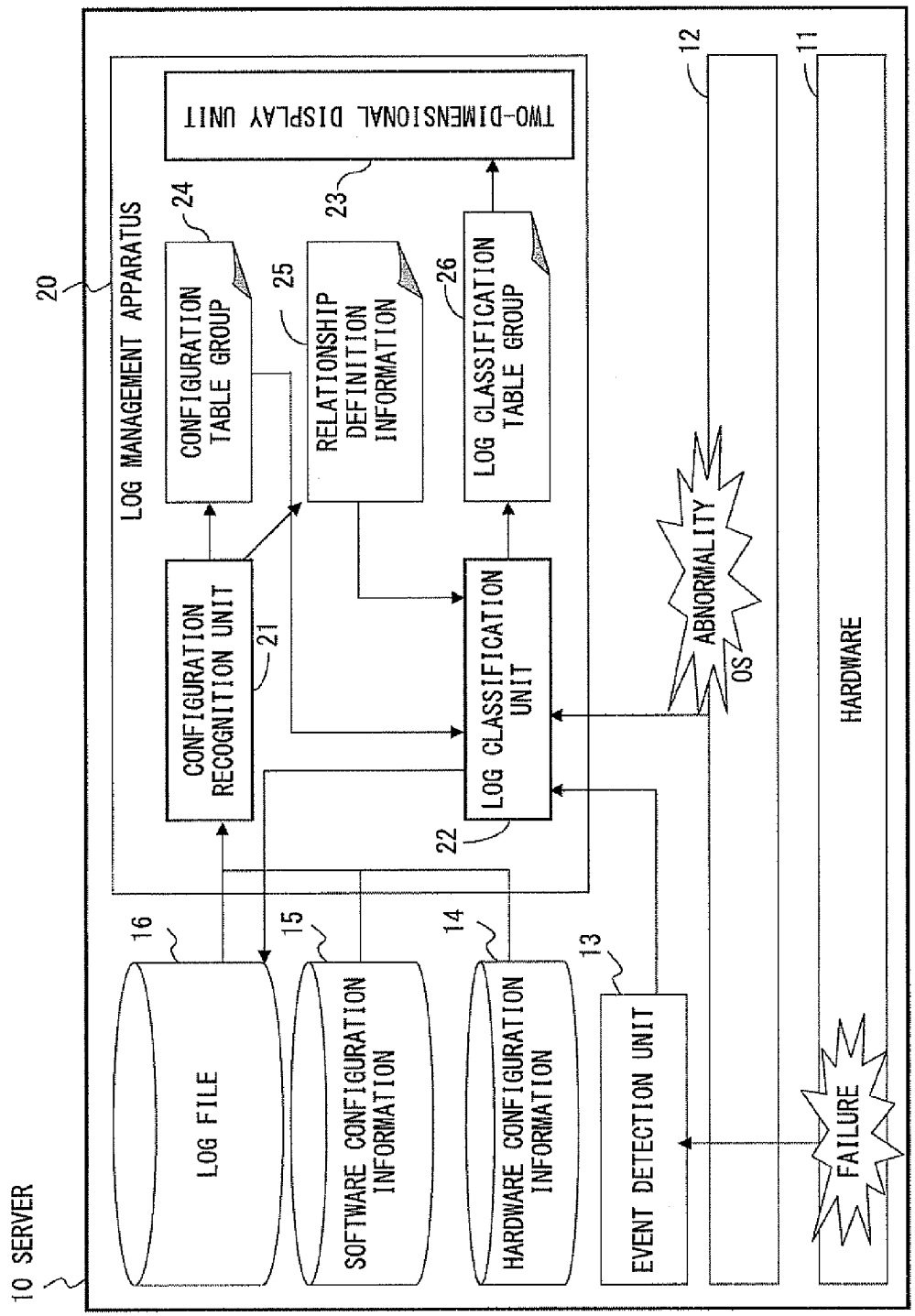
FIG. 4 is a configuration of a log management apparatus in this preferred embodiment.

FIG. 4 is a configuration of a log management apparatus in this preferred embodiment. The log management apparatus 20 is mounted on a server 10 for providing services via a communication network in order to manage logs obtained by monitoring monitor targets existing in the server 10. For example, it can be realized by a program mounting a function to enable it to operate as the log management apparatus 20 (hereinafter called "log management software" or "log management program").

The server 10 is made of a hardware group 11, such as a CPU (central processing unit), memory, a system controller, a hard disk device (HDD), a host bus adaptor and the like, and mounts software (middle-ware, an application program, etc.) operating in an operating system (OS) 12. The respective pieces of hardware, such as the CPU (central processing unit), memory, system controller, hard disk device (HDD), host bus adaptor and the like and respective pieces of software, such as middle-ware, an application program and the like can be made monitor targets whose logs are kept. The OS 12 monitors the operation of respective pieces of software in execution, and when some kind of abnormality or failure has occurred, outputs a log indicating the contents of the event to the log management apparatus 20. The OS 12 also monitors the operations of the respective pieces of hardware constituting the hardware group 11, and when some abnormality or a failure has occurred, notifies an event detection unit 13 of the fact. In response to the notice, the event detection unit 13 outputs a log indicating the occurred event (warning, abnormality or a failure) and hardware in which the event has occurred to the log management apparatus 20. The log management apparatus 20 stores logs outputted from the OS 12 or the event detection unit 13 thus in a prescribed log file 16.

The log management apparatus 20 includes a configuration recognition unit 21, a log classification unit 22 and a two-dimensional display unit 23, and manages a configuration table group 24, relationship definition information 25 and a classification log table group 26 as data other than the log file 16. Those pieces of data are stored in, for example, a hard disk device and are read into the memory, as requested.

The server 10 manages hardware configuration information 14 and software configuration information 15. The hardware configuration information 14 collects the information of the hardware for each piece of hardware, such as a CPU (central processing unit), memory, a system controller, a hard disk device (HDD), a host bus adaptor and the like, which constitute the server 10. The software configuration information 15 collects the information of the software for each piece of software executed by the server 10. The hardware and software whose information is stored in the configuration information 14 or 15 becomes monitor targets whose logs are outputted.

The configuration recognition unit 21 generates a hardware configuration table 24a (FIG. 5) and a software configuration table 24b (FIG. 6) as the configuration table group 24, referring to the hardware configuration information and the software configuration information 15. The configuration tables 24a and 24b are generated by extracting information stored in, for example, the hardware configuration information 14 and the software configuration information 15 and storing them, respectively.

FIG. 5 is a data structure of the hardware configuration table 24a. FIG. 6 is a data structure of the software configuration table 24b.

As illustrated in FIG. 5, the hardware configuration table 24a stores respective pieces of data of the component name, mounting position, state and keyword of each piece of hardware for each piece of hardware, such as the CPU (central processing unit), the memory, the system controller, the hard disk device (HDD), the host bus adaptor and the like. As the keywords, one or more expressions indicating corresponding to piece of hardware are collected.

Hereafter, expressions "hardware" and "software" are used to indicate respective categories. Ones belonging to the hardware and the software are expressed as a "component" and "software", respectively.

The software configuration table 24b stores respective pieces of data of the description (expressed as a "software name" in FIG. 6), category and detailed information of each piece of software, as illustrated in FIG. 6. The category corresponds to the type of corresponding software or its mounting form. For example, expressions "system" and "application" indicate software mounted on the OS 12 and an application program, respectively. The detailed information is the information of the function, usage or the like of each piece of software.

The configuration recognition unit 21 generates relationship definition information 25 besides the configuration table group 24 composed of the hardware configuration table 24a and the software configuration table 24b. The relationship definition information 25 defines a relationship between monitor targets belonging to different categories, as illustrated in FIG. 7. In the example illustrated in FIG. 7, a component whose name is "component HA" is related to software whose name is "software SA". A component whose name is "component HB" is related to software whose name is "software SB". Software whose name is "software SC" is related to no component.

For example, when executing software, hardware needed to execute the software is operated. Therefore, when an event due to which a certain component does not normally operate occurs in it, such as abnormality, a failure or the like, occurs, the event affects software operating the component. Alternatively, sometimes hardware does not normally operate due to the inconvenience of software. This means that there is an operational relationship (dependence relationship) in log output between monitor targets belonging to different categories. For example, when the log of a certain component is outputted, the log of software operating the component is also outputted. Therefore, in this preferred embodiment, a combination of monitor targets in which such a relationship exists or is estimated to exist when a maintenance personnel analyzes a log, is defined in the relationship definition information 25 and is used to output a log.

The combination of monitor targets is defined by the configuration recognition unit 21, namely, the relationship definition information 25 is generated and updated by the configuration recognition unit 21. The configuration recognition unit 21 generates relationship definition information 25 between a component constituting hardware and software, referring to the hardware configuration table 24a and the software configuration table 24b. They are generated by referring to keywords stored in the hardware configuration table 24a for each component and detailed information stored in the software configuration table 24b for each piece of software. By the reference, a combination of monitor targets considered to have a relationship in log output is extracted on the basis of the keyword and the detailed information and relationship definition information 25 storing its combination information is generated.

Both the hardware configuration information 14 and the software configuration information 15 have a possibility of being updated by the modification of its system configuration or the like. Therefore, the configuration recognition unit 21 updates any of the hardware configuration table 24a, the software configuration table 24b and the relationship definition information 25, according to its state.

Figure 8:
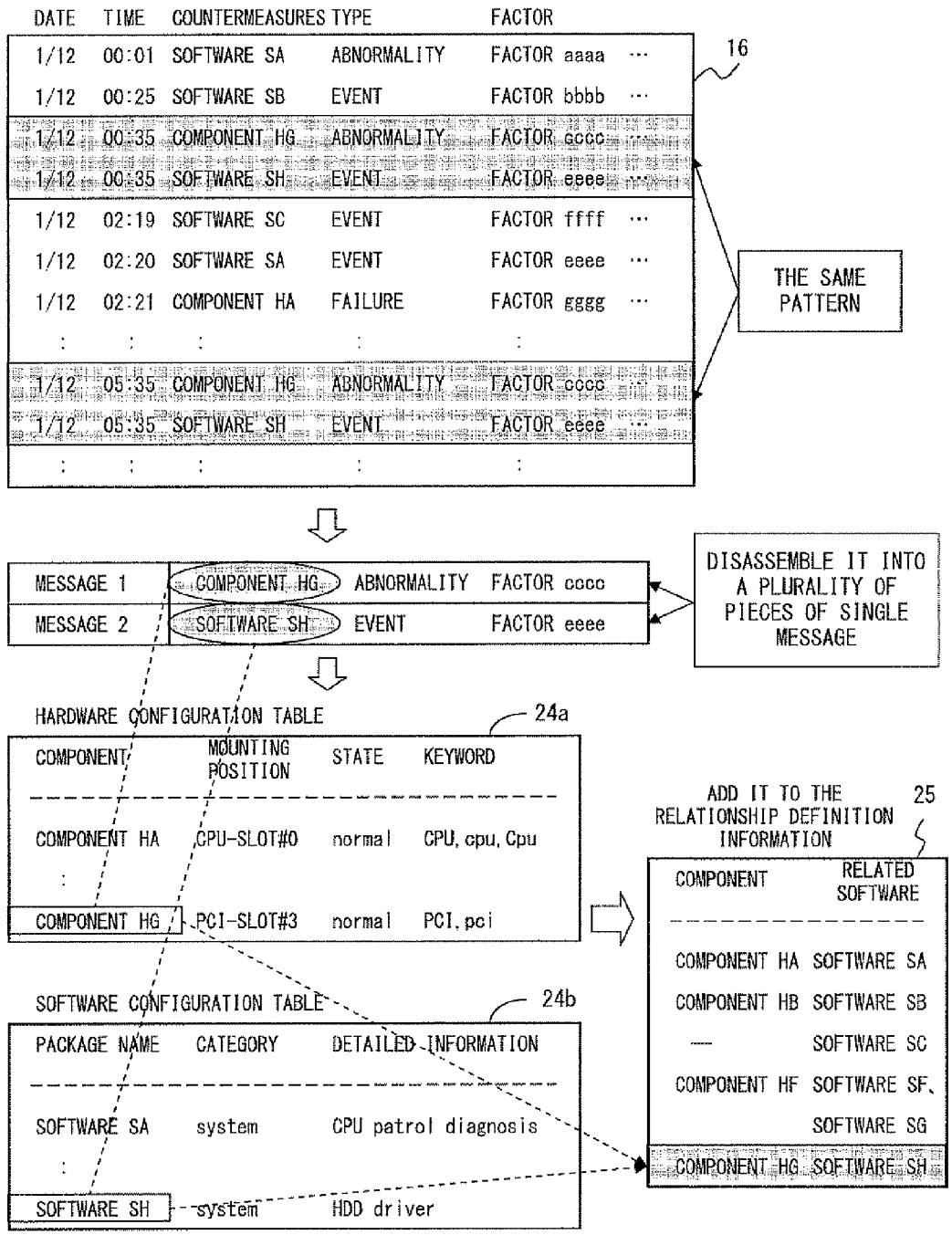
FIG. 8 explains how to update the relationship definition information.

FIG. 8 explains how to update the relationship definition information 25.

The log file 16 stores the logs of components or software in time sequence. Each log includes respective pieces of data of its outputted date, its time, its monitor target, its type and its factor. As described above, when abnormality or a failure occurs in a certain component, the event affects software operating the component. Therefore, an event that has occurred in a certain component outputs the log of software operating the component after outputting its log. In this preferred embodiment, focusing on this, when the same pattern in which one or more logs of a monitor target belonging to software continue after the log of a monitor target belonging to hardware is repeated a plurality of times, it is regarded that there is relationship between those monitor targets and those monitor targets are registered in the relationship definition information 25. In the example illustrated in FIG. 8, since a pattern in which the log of software SH continues after the log of a component HG is repeated, the combination of the component HG and the software SH is newly registered in the relationship definition information 25.

The log classification unit 22 stores logs outputted from the OS 12 or the event detection unit 13 in the log file 16. The logs are stored in a corresponding table, of tables (log classification tables) prepared for each monitor target registered in the configuration table group 24. Therefore, a log classification table group 26 is composed of log classification tables prepared for each monitor target. The logs are arranged/classified by storing logs in different classification log tables for each monitor target.

Figure 9:
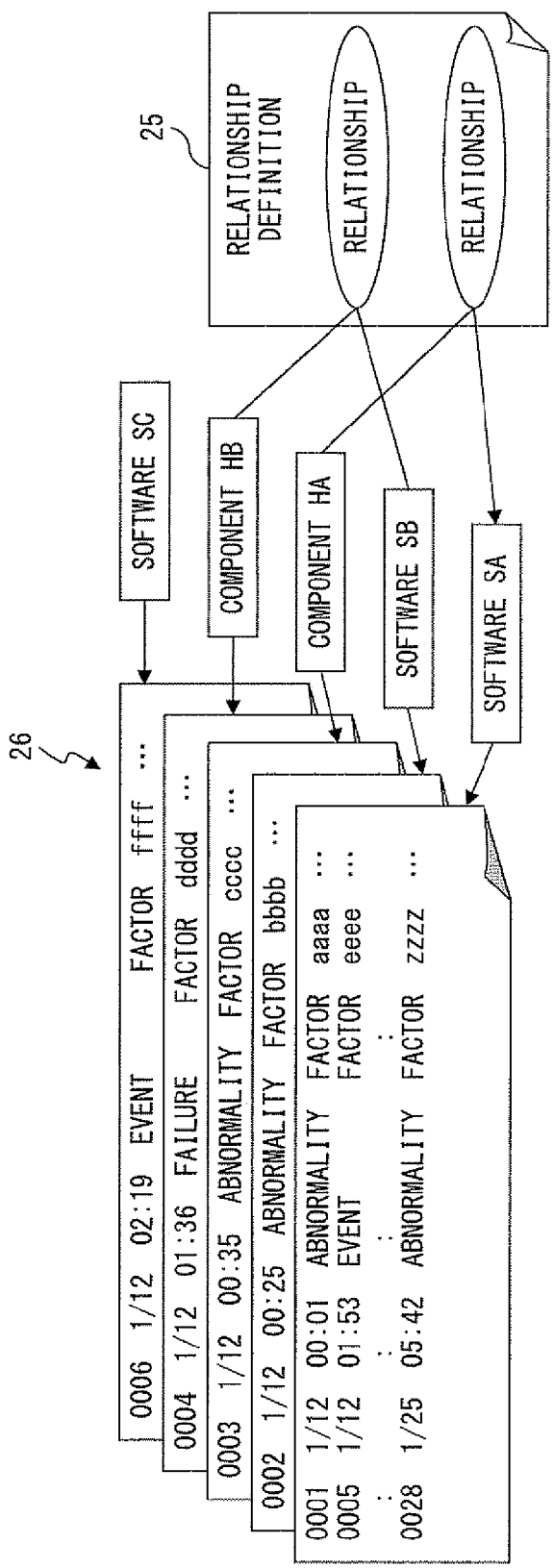
FIG. 9 explains how to relate logs.
Figure 10:
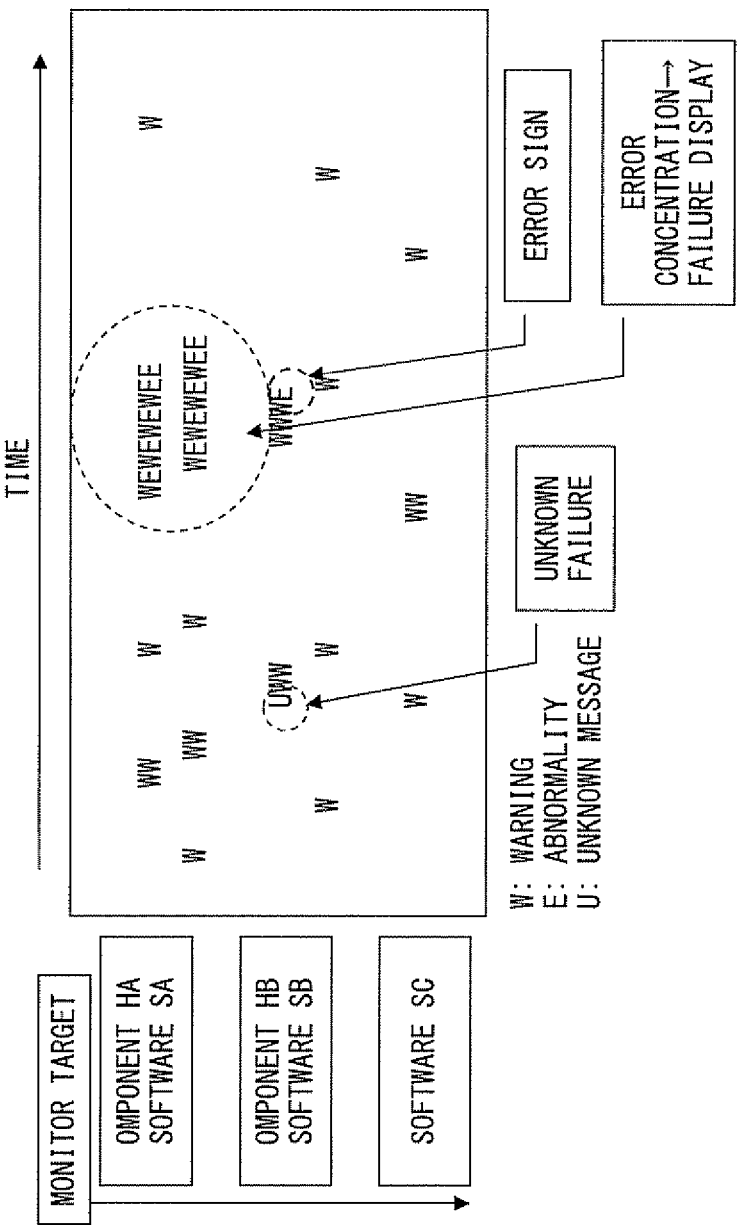
FIG. 10 is an example of log display.

The two-dimensional display unit 23 relates monitor targets belonging to different categories, referring to the relationship definition information 25 and two-dimensionally displays logs. FIG. 9 explains how to relate logs to each other. FIG. 10 is an example of the log display.

As illustrated in FIG. 9, logs read from each log classification table are collected according to the relationship definition information 25. As illustrated in FIG. 10, the logs are displayed for each combination of monitor targets which are related and belong to different categories, arranging symbols indicating the contents of the logs in time sequence. In this case, as the symbols, for example, only "W" indicating warning (a log outputted by a warning operation), "E" indicating abnormality (a log outputted by the occurrence of abnormality) and "U" indicating a log (described as "unknown message") outputted by a monitor target not registered in the configuration table group 24 are used. In FIG. 10, although they are two-dimensionally displayed using a graph whose vertical and horizontal axes are a monitor target and time, respectively, they can be also two-dimensionally displayed using graph whose vertical and horizontal axes are time and a monitor target, respectively.

As illustrated in FIG. 10, in a monitor target in which some failure occurs and one in another category, having a relationship with the monitor target, logs are outputted in high frequency. The logs of those monitor targets are collectively displayed. Therefore, maintenance personnel coping with a failure can easily focus on (initially isolate) monitor targets (questionable places) having a possibility that a failure may have occurred. Therefore, questionable places are seldom missed. Since logs are arranged in time sequence for each monitor target, a monitor target in which a failure often occurs, a time zone such a failure easily occurs and the like can be also easily detected. Therefore, maintenance personnel can more easily cope with a failure appropriately and more easily analyze it quickly.

In this preferred embodiment, each log classification table is retrieved and when a log indicating warning or an error (abnormality, a failure or the like) due to the same factor is recorded a certain times or more within a certain time, a monitor target corresponding to the log classification table is regarded to have failed and the fact is warned and displayed. By the warning display, a questionable place can be prevented from being missed and a failure can be easily coped with beforehand. The warning display is made by modifying the display colors of symbols.

Figure 11:
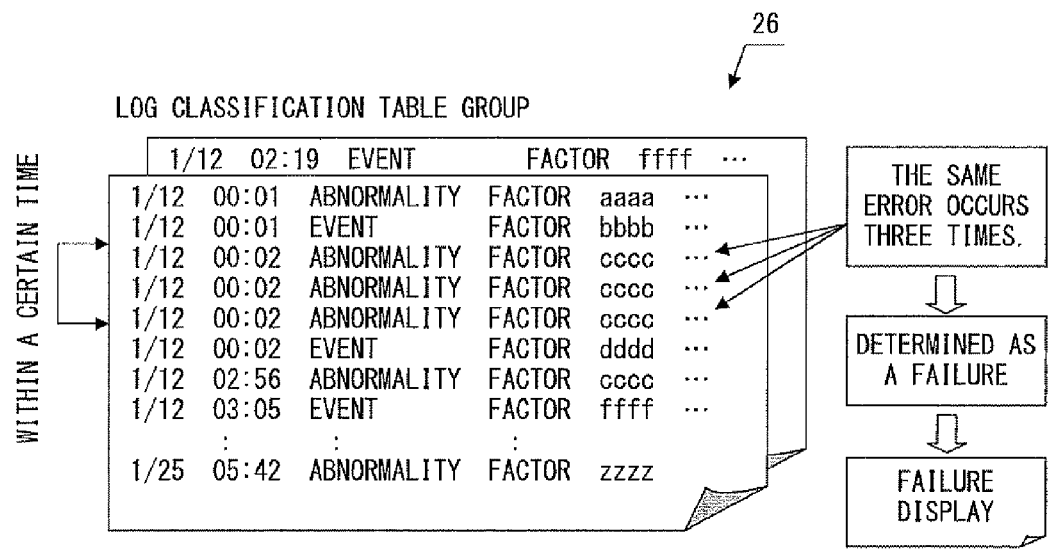
FIG. 11 explains how to determine a failure.

FIG. 11 explains how to determine a failure.

In the log classification table illustrated in FIG. 11, a log due to abnormality whose factor is "cccc" is recorded three times within a certain time. In this preferred embodiment, logs due to the same factor are searched for within a certain time and it is determined whether a monitor target corresponding to a log classification table has failed, on a condition that such a log is recorded three or more times. When it is determined that it has failed, the fact is indicated by modifying the display color of a symbol. In FIG. 10, a symbol whose display color is changed is indicated by enclosing it by a broken line tagged "error concentration→failure display". The symbols enclosed by such a broken line are "W" and "E" that are alternately repeated in a component HA and software SA.

Furthermore, in this preferred embodiment, statistic information is stored for each log classification table. The statistic information includes the count result (count value) of times a log due to the same factor is recorded. When a new log is recorded, its statistic information, that is, a corresponding count value is updated. For example, the count values are divided into predetermined time zones and are stored. This is because the load weight of the server 10 and its provided services have a tendency of often varying depending on a time zone.

When there is some inconvenience in a monitor target, a log due to the same factor are outputted in high frequency. Usually, when an inconvenience is neglected, matching of data, a state and the like is lost by the inconvenience being propagated to another piece of hardware or software and finally a system panic is caused. Therefore, statistic information, that is, the count value of logs due to the same is used to determine a possibility that a fatal error may occur in the future. When it is determined that there is a high possibility that a fatal may error (failure), the possibility (error sign) is warned and displayed. By such a warning display, a failure can be easily coped with.

FIG. 12 explains how to determine an error sign.

In FIG. 12, a figure described as "1111223 . . . " on the right side of a log classification table from top indicates the count value of a log due to the same factor. In this preferred embodiment, by setting a threshold value for determining whether an error sign is warned to 3, the monitor target of a log whose count value is 3 or more is regarded to be warned by an error sign. A monitor target to be warned by an error sign is indicated by modifying the display color of the symbol of the log. In FIG. 10, symbols whose display color is changed in order to warn an error sign are enclosed by a broken line tagged "error sign". The symbol enclosed by such a broken line is "E" positioned after three "W" in a component HB.

As described above, the log management apparatus according to this preferred embodiment can be realized by the server 10 executing log management software. Hereinafter, a process performed in order to realize the configuration recognition unit 21, the log classification unit 22 and the two-dimensional display unit 23 will be explained in detail with reference to the flowcharts illustrated in FIGS. 13 through 17.

Figure 13:
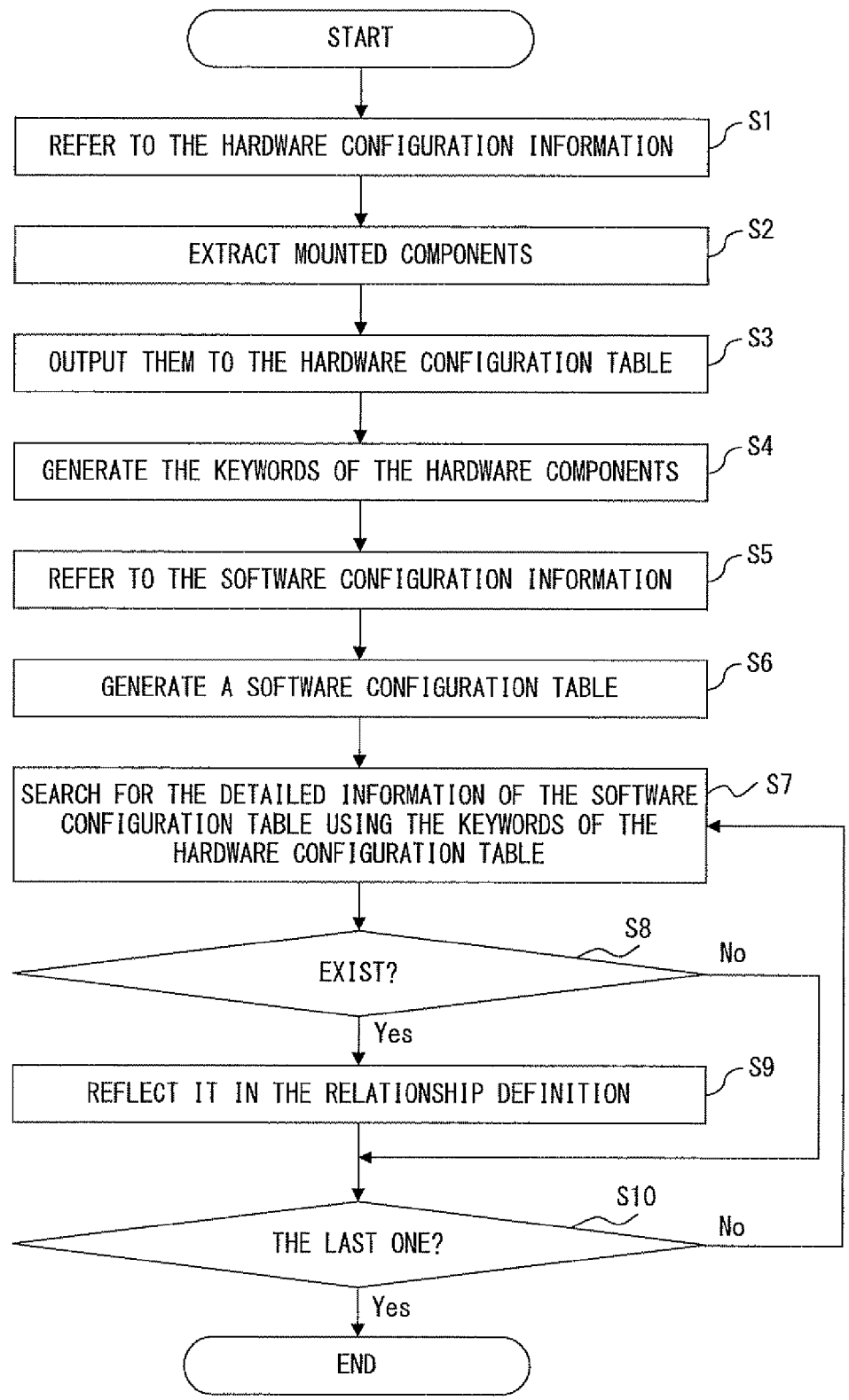
FIG. 13 is a flowchart of a relationship definition information generation process.

FIG. 13 is a flowchart of a relationship definition information generation process. This generation process is performed in order to generate the configuration table group 24 (hard configuration table 24a and software configuration table 24b) and the relationship definition information 25. For example, the process is performed using confirmation that there is no configuration table group 24 and relationship definition information 25 after the activation of the log management software as a trigger. Firstly, this generation process will be explained in detail with reference to FIG. 13.

Firstly, in step S1 the hardware configuration information 14 is referenced. Then, in step S2 the information of components registered in the configuration information 14 is extracted. Then, in step S3 the hardware configuration table 24a is generated in a non-volatile storage device, such as a hard disk device or the like and the extracted information is stored in it. Then, in step S4 "normal" indicating that it is normally operating as a state for each component whose information is stored. Furthermore, keywords are generated for each component on the basis of the information its mounting position and the information of other items and are stored. Thus, a hardware configuration table 24a with the contents as illustrated in FIG. 5 is generated.

Then, in step S5 the software configuration information 15 is referenced. In step S6, the information of software registered in the configuration information 15 are extracted and a software configuration table 24b storing the extracted information, as illustrated in FIG. 6 is generated. Then, the process advances to step S7.

In step S7 the keywords of the components registered in the hardware configuration table 24a are extracted and its detailed information of the software configuration table 24b using the keywords is searched for. Then, in step S8 it is determined whether there is detailed information including the keywords. If the detailed information including the keywords can be extracted as a result of the search, it is determined yes and the process moves to step S9. Otherwise, it is determined no and the process advances to step S10.

In step S9 a combination of a component having the keywords used for the retrieval and software having detailed information including the keywords is reflected in the relationship definition information 25 and information indicating the combination is stored. Then, in step 10 it is determined whether the component having the keywords used for the retrieval is the last one in the hardware configuration table 24a. If there is no other component being a keyword target, it is determined yes and the relationship definition information generation process is terminated here. Otherwise, it is determined no and the process returns to step S7. Thus, retrieval is conducted using the keywords of another component.

For example, "CPU" being one of the keywords of a component HA exists in the detailed information of software SA. "MEM", "mem" and the like being the keywords of a component HB are regarded to correspond to "Memory" in the detailed information of software SB (FIGS. 5 and 6). Therefore, two combinations of the component HA and the software SA, and the component HB and the software SB are registered in the relationship definition information 25.

Figure 14:
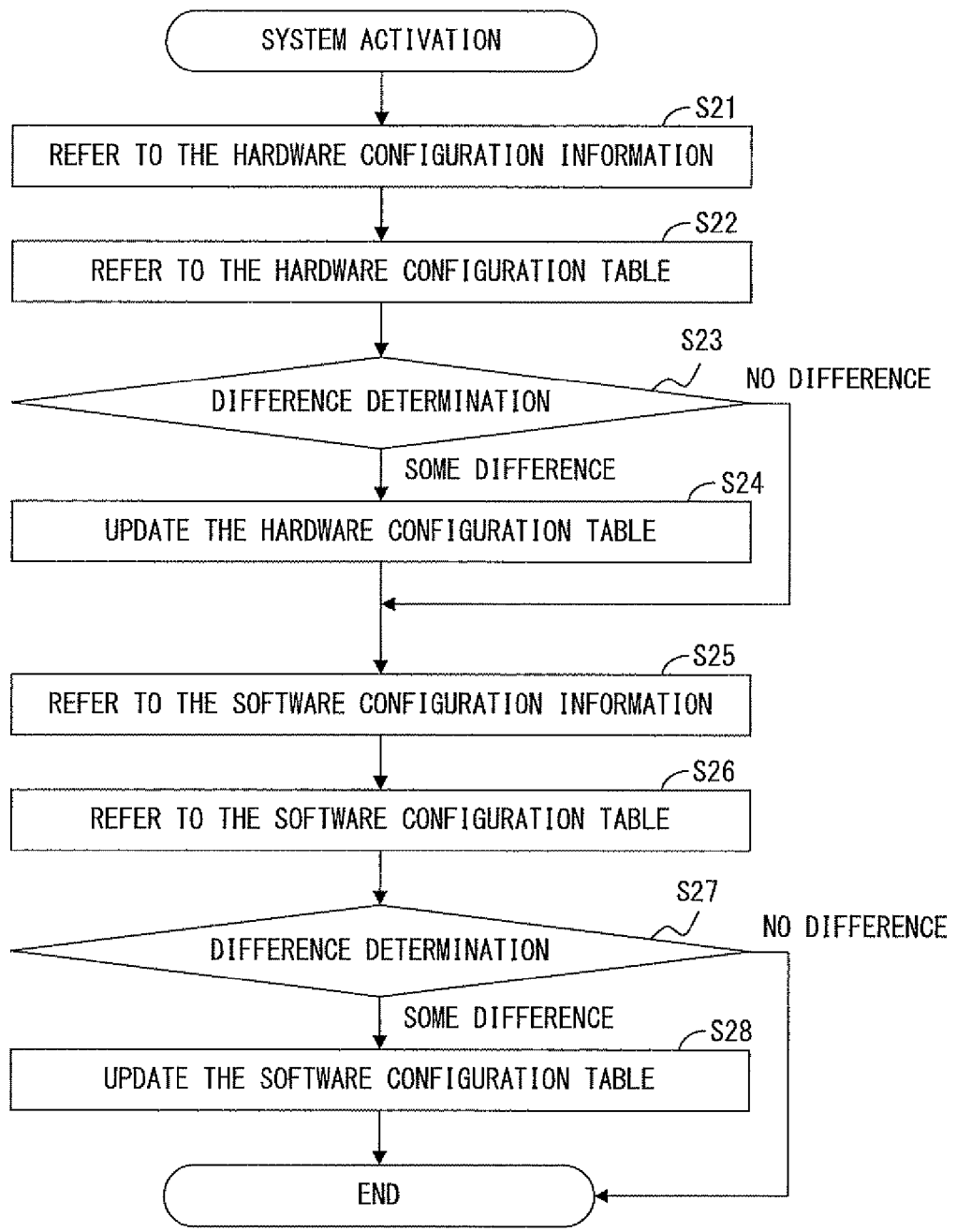
FIG. 14 is a flowchart of a configuration table update process.

FIG. 14 is a flowchart of a configuration table update process. This update process is performed in order to update the hardware configuration table 24a or the software configuration table 24b in accordance with the update of the hardware configuration information 14 or the software configuration information 15. For example, it is performed one time on no condition after the activation of the log management software. Then, this update process will be explained in detail with reference to FIG. 14.

Firstly, in step S21 the hardware configuration information 14 is referenced. Then, in step S22 the hardware configuration table 24a is referenced. Then, in step S23 difference is determined between the hardware configuration information 14 and the hardware configuration table 24a, namely, it is determined whether there is a component registered in only one of them. If there is no such component, it is determined that there is no difference and the process advances to step S25. Otherwise, it is determined that there is a difference and the process advances to step S24. Then, in step S24 the hardware configuration table 24a is updated in such a way that its registered components may be matched with those of the hardware configuration information 14. After the update, the process advances to step S25.

In step S25 the software configuration information 15 is referenced. Then, in step S26 the software configuration table 24b is referenced. Then, in step S27 difference is determined between the software configuration information 15 and the software configuration table 24b, namely, it is determined whether there is software registered in only one of them. If there is no such software, it is determined that there is no difference and the configuration table update process is terminated here. Otherwise, it is determined that there is a difference and the process advances to step S28. Then, in step S28 the software configuration table 24b is updated in such a way that its registered software may be matched with that of the software configuration information 15. After the update, this configuration table update process is terminated.

Figure 15:
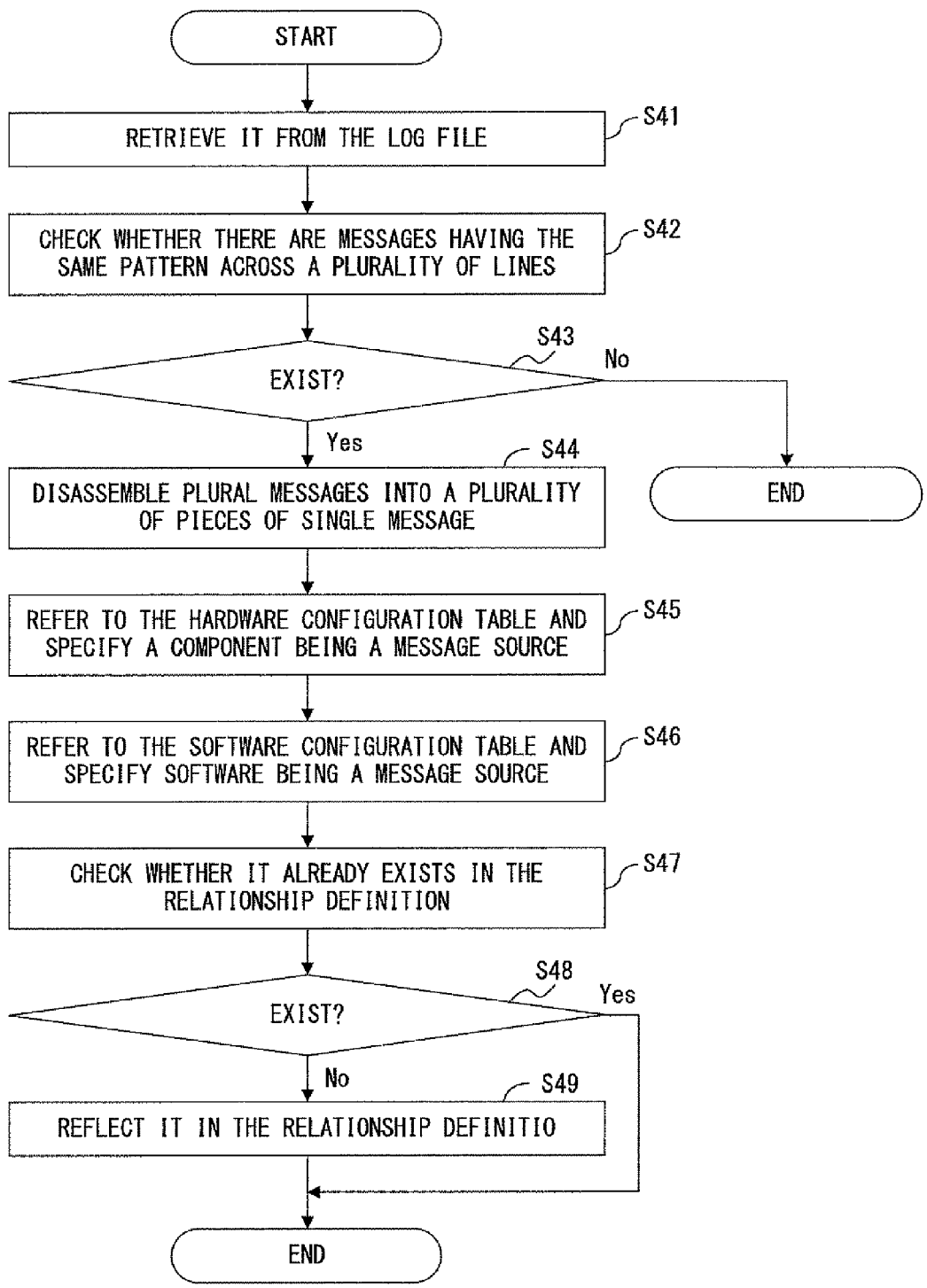
FIG. 15 is a flowchart of a relationship definition information update process.

FIG. 15 is a flowchart of a relationship definition information update process. This update process is performed in order to update the relationship definition information 25 referring to logs recorded on the log file 16. For example, it is performed after the activation of the log management software or at certain time intervals. Then, this update process will be explained in detail with reference to FIG. 15. The relationship definition information 25 is updated by the method illustrated in FIG. 8.

Firstly, in step S41 the log file 16 is retrieved using the recorded logs as keys. Then, in step S42 by the retrieval it is detected whether there are logs (messages) having the same pattern across a plurality of lines, that is, it is checked whether a plurality of logs of different monitor targets continues in the same order and also there is a plurality of the same patterns all the belonging categories of which are not the same. In step S43 by the check it is determined whether there is a plurality of the same patterns. If there is a plurality of the same patterns, it is determined yes and the process advances to step S44. Otherwise, it is determined no and the relationship definition information update process is terminated here.

In step S44 the same pattern, that is, logs (messages) of a plurality of lines are divided into single log. In step S45 logs of each monitor target belonging to hardware are extracted and a component to be monitored is specified referring to the hardware configuration table 24a. Then, in step S46, logs of each monitor target belonging to software are extracted and software to be monitored is specified referring to the software configuration table 24b. After the specification, the process advances to step S47.

In step S47 it is determined whether a combination of the monitor targets specified in steps S45 and S46, respectively, already exists in the relationship definition information 25. If such a combination is already registered, it is determined yes and the relationship definition information update process is terminated here. Otherwise, it is determined no and the process advances to step S49. In step S49 the combination is reflected in the relationship definition information 25. Then, the relationship definition information update process is terminated.

By performing each process illustrated in FIGS. 13 through 15, the configuration table group 24 and the relationship definition information 25 are generated and updated, if needed. Thus, the configuration recognition unit 21 can be realized.

FIG. 16 is a flowchart of a log classification process. This classification process is performed in order to record logs outputted from the OS 12 or the event detection unit 13 on the log file 16 and to store them corresponding log classification tables. For example, it is performed using the output of a log from the OS 12 or the event detection unit 13 as a trigger. The log classification unit 22 can be realized by performing this classification process. Next, this classification process will be explained in detail with reference to FIG. 16.

Firstly, in step S61 a log notified by the OS 12 or the event detection unit 13 is inputted. Then, in step S62, the inputted log is stored in an internal buffer. Then, in step S63, the log stored in the internal buffer (described as "event information" in FIG. 16) is recorded on the log file 16. Then, the process advances to step S64.

In step S64, a configuration table corresponding to the log is referenced. Then, in step S65, it is checked whether a monitor target (described as an "event" in FIG. 16) from which the log is outputted included in the configuration table. Then, in step S66 it is determined whether the monitor target is included in the configuration table. If the monitor target is recorded on the configuration table, it is determined yes and the process advances to step S67. Otherwise, it is determined no and the process advances to step S71.

In step S67 a log classification table storing the log is determined. Then, in step S68 the log is stored in the determined table. Then, in step S69 the internal buffer is erased and the log classification process is terminated.

In step S70 the log stored in the internal buffer is specified as one of an unknown monitor target not registered in the configuration table (configuration table group 24). Then, in step S71 a configuration table corresponding to the monitor target outputted this log is updated, and a log classification table for storing the log is generated. After the generation, the process advances to step S68 and the log is stored in the generated log classification table.

The first log outputted from the unknown monitor target is indicated by "U", as illustrated in FIG. 10. The first log can be always specified, for example, by writing data indicating so as its type.

In this preferred embodiment, the configuration table group 24 is referenced and a log classification table is generated for each registered monitor target. However, logs stored in each log classification table are collected and displayed according to the relationship definition information 25. Therefore, the generated log classification table can be also limited for monitor targets registered in the relationship definition information 25 as combinations.

Figure 17:
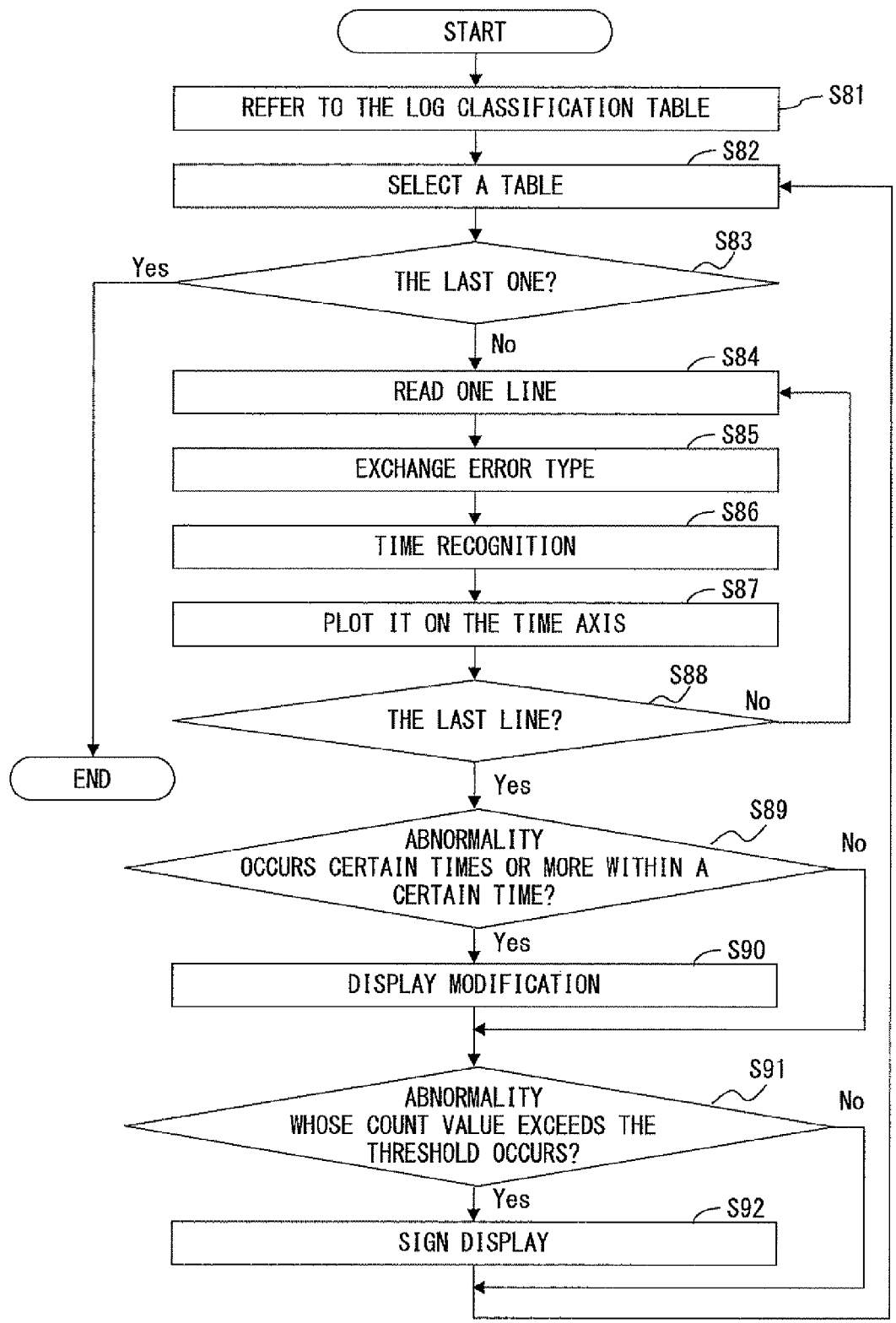
FIG. 17 is a flowchart of a two-dimensional display process.

FIG. 17 is a flowchart of a two-dimensional display process. This display process is performed in order to two-dimensionally display a log, as illustrated in FIG. 10. For example, it is performed using a fact that a log is instructed to be outputted by maintenance personnel or the like. The two-dimensional display unit 23 can be realized by performing this display process. Lastly, this display process will be explained in detail with reference to FIG. 17.

Firstly, in step S81 the log classification group 26 is referenced. Then, in step S82 one of the log classification tables is selected. Then, in step S83 it is determined whether the previously selected log classification table S84 is the last one. If there is no log classification table to be selected this time, it is determined yes and the two-dimensional display process is terminated here. Otherwise, it is determined no and the process advances to step S84.

Logs are outputted in time sequence. Therefore, in steps S84 through S88, logs are sequentially read from the head of the log classification table (in descending order of record) and symbols indicating them are arranged.

Firstly, in step S84 one line (one log recorded on one line) is read. Then, in step S85, the log is converted into symbol corresponding to its type. Then, in step S86 its date and time are extracted and its time is recognized. Then, in step S87 the symbol is plotted in position determined by its recognized time. Then, the process advances to step S88 and it is determined whether the log whose symbol arrangement is determined is the last line. If the log is recorded on the last line, it is determined yes and the process advances to step S89. Otherwise, it is determined no and the process returns to step S84.

In step S89 it is determined whether there is a log outputted due to the same factor of abnormality a certain times or more within a certain time (FIG. 11). If there is such a log, it is determined yes. Then, after in step S92 display is modified in order to warn and display a failure, namely, the display color of the symbols is modified, the process advances to step S91. Otherwise, it is determined no and the process advances to step S91.

In step S91 it is determined whether there is a log whose count value exceeds its threshold value, of the logs outputted due to the same factor of abnormality (FIG. 12). If there is such a log, it is determined yes. Then, after in step S92 display is modified in order to warn and display a failure, namely, the display color of the symbols is modified, the process returns to step S82. Otherwise, it is determined no and the process returns to step S82.

In step S82 a log classification table is selected by referring to the relationship definition information 25. Thus, after selecting one of the combinations registered in the relationship definition information 25, the remaining combination is selected. By such a selection, as illustrated in FIG. 10, the logs of monitor targets is collected and displayed for each combination registered in the relationship definition information 25.

Although this preferred embodiment is realized in the server 10 being a computer mounting monitor targets, it can also be realized as an external device or in the external device. Furthermore, although the outputted logs are arranged in advance by storing them in their corresponding log classification tables, logs recorded on the log file 16 can also be arranged at the output time of the logs.

FIG. 18 is one example of the preferred embodiment of the hardware composition. Next, the configuration of a computer (information processing apparatus) applicable as a log management apparatus according to this preferred embodiment will be explained in detail with reference to FIG. 18.

The computer illustrated in FIG. 18 includes a CPU 61, memory 62, an input device 63, an output device 64, an external storage device 65, a medium driving device 66 and a network connection device 67, which are connected to each other by a bus 68. The configuration illustrated in FIG. 18 is one example and is not restrictive of the invention The CPU 61 controls the entire computer.

The memory 62 is RAM or the like, for temporarily storing programs or data stored in the external storage device 65 (or a portable storage medium M) when executing the programs, updating the data and so on. The CPU 61 controls the entire computer by reading the programs into the memory 62.

The input device 63 is an interface connected to an operation device, such as a keyboard, a mouse and the like. It detects the operation of a user on the operation device and notifies the CPU 61 of the detection result.

The output device 64 is, for example a display control device connected to a display device. The network connection device 67 is used to communicate with an external device via a communication network, such as an intra-net, the internet or the like. The external storage device 65 is, for example, a hard disk device. It is chiefly used to store various pieces of data and programs.

The medium driving device 66 is used to access a portable storage medium M, such as an optical device, a magneto-optical disk and the like.

In the above-described configuration, the log management software can be obtained by accessing the external storage device 65 or the storage medium M or via the network connection device 67. By enabling the CPU 61 to execute such obtainable log management software, the log management apparatus 20 according to this preferred embodiment can be realized.

The configuration table group 24, the relationship definition information 25 and the log classification group 26 are stored in, for example, the external storage device 65 and are read into the memory, as requested. The log file 16, the hardware configuration information 14 and the software configuration information 15 are stored in, for example, the external storage device 65. Log can be also outputted (displayed) by recording data on the storage medium M via the medium driving device 66. Therefore, the log management apparatus 20 can be also mounted on another information processing device different from the server 20 for outputting logs. A plurality of information processing apparatuses for enabling the log management apparatus 20 to manage logs can be also used.

As described above, components being hardware constituting the information processing apparatus (computer) operate under the control of a program (software) executed in the information processing apparatus. Therefore, an operational relationship (dependence relationship) in log output in which when a component operated by a program does not normally operate or an inconvenience exists in a program for operating a component, by the output of the log of a monitor target belonging to one category, the log of another monitor target related to the monitor target is outputted, if monitor targets are classified into categories of software and hardware, is established.

Focusing on this relationship (dependence relationship), logs are classified for each monitor target and outputted (displayed). In a monitor target which is the cause of a failure and in which a dependence relationship with the monitor target exists, a log is outputted in fairly high frequency. Therefore, maintenance personnel can easily focus on (initially isolate) monitor targets that can be considered as the cause of a failure. Therefore, the maintenance personnel can more easily cope with the failure.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiment of the present invention have been described in detail, it should be understood that the various changes, substitutions, and alterations could be made hereto without departing from the spirit and scope of the invention.

The invention claimed is:

1. A log management method for managing logs outputted from an information processing apparatus by monitoring components, the log management method comprising:
classifying the logs outputted from the information processing apparatus for each of monitor targets which are components including respective pieces of hardware in the information processing apparatus and respective pieces of software executed on the information processing apparatus, and storing each of the classified logs in a table which is generated for each of the monitor targets;
dividing the monitor targets into categories of hardware and software, referring to relationship definition information indicating a combination of monitor targets, in which it is regarded that an operational relationship exists between monitor targets belonging to different categories and specifying a combination indicated in the relationship definition information among the monitor targets;

relating the logs each of which is stored in the table generated for each of the monitor targets on the basis of the combination specified in the specification process; and outputting the related logs on a display device.

2. The log management method according to claim 1, further comprising updating the relationship definition information by registering the combination as the relationship definition information on the basis of order of the monitor targets from which the logs are outputted and categories to which the monitor targets belong.

3. The log management method according to claim 2, wherein the classifying classifies logs by generating a table for storing logs outputted from the monitor targets for each of the monitor targets.

4. The log management method according to claim 2, wherein the updating process registers a combination of a plurality of monitor targets from which logs constituting the same pattern as the relationship definition information by monitoring order of the monitor targets from which the logs are outputted when the same pattern in which logs of a plurality of monitor targets belonging to different categories continues is repeated a plurality of times.

5. The log management method according to claim 1, wherein the outputting arranges, displays and outputs symbols indicating logs classified for each of the monitor targets in the classification process in time sequence for each of the combinations specified in the specification process.

6. The log management method according to claim 5, further comprising analyzing logs outputted within a certain time for each of the monitor targets and determining a state of a monitor target from which the logs are outputted, wherein the outputting also outputs a determination result in the analysis process.

7. A log management apparatus for managing logs outputted from an information processing apparatus by monitoring components constituting the information processing apparatus and a program in execution as monitor targets, the log management apparatus comprising:

a classification unit that classifies the logs outputted from the information processing apparatus for each of monitor targets which are components including respective pieces of hardware in the information processing apparatus and respective pieces of software executed on the information processing apparatus, and stores each of the classified logs in a table which is generated for each of the monitor targets;

an information storage unit that divides the monitor targets into categories of hardware and software and storing relationship definition information indicating a combination of monitor targets, in which it is regarded that an operational relationship exists between monitor targets belonging to different categories;

a specification unit that refers to the relationship definition information stored in the information storage unit and specifying a combination indicated in the relationship definition information among the monitor targets; and an output unit that relates the logs each of which is stored in the table generated for each of the monitor targets on the basis of the combination specified by the specification unit and outputs the related logs on a display device.

8. A non-transitory computer readable storage medium having stored therein a log management program for causing a computer used as a log management apparatus to execute a process for managing logs outputted from the information processing apparatus by monitoring components, the process comprising:

classifying the logs outputted from the information processing apparatus for each of the monitor targets which are components including respective pieces of hardware in the information processing apparatus and respective pieces of software executed on the information processing apparatus, and storing each of the classified logs in a table which is generated for each of the monitor targets;

dividing the monitor targets stored in the storage unit into categories of hardware and software, referring to the relationship definition information stored in the information storage unit and specifying a combination indicated in the relationship definition information among the monitor targets;

relating the logs each of which is stored in the table generated for each of the monitor targets on the basis of the combination specified by the specification function; and outputting the related logs on a display device.

\* \* \* \* \*